| United States Patent [19] | [11] 3,811,152 |
|---|---|
| Herubel | [45] May 21, 1974 |

[54] MACHINE FOR SEPARATING A SHOULDER FROM A FOREQUARTER OF MEAT

[75] Inventor: Jean Frédéric Herubel, Guebwiller, France

[73] Assignee: N. Schlumberger & Cie., Guebwiller, France

[22] Filed: July 14, 1972

[21] Appl. No.: 272,069

[30] Foreign Application Priority Data
July 23, 1971 France .............................. 71.27020

[52] U.S. Cl............................. 17/1 R, 17/23, 17/52
[51] Int. Cl.............................................. A22c 5/20
[58] Field of Search.......................... 17/1 R, 52, 23

[56] References Cited
UNITED STATES PATENTS
2,634,457  4/1953  Moyer et al. ........................... 17/23
3,639,945  2/1972  Poultry Cutter ................ 17/52 X
3,317,949  5/1967  Garcia et al. ..................... 17/1 R X Primary Examiner—Robert Peshock
Assistant Examiner—D. L. Weinhold
Attorney, Agent, or Firm—Toren, McGeady & Stanger

[57] ABSTRACT

The machine essentially comprises : a frame, means for suspending a quarter of meat by the shank, a cutting-tool for separating the shoulder from the remainder of the quarter, means for guiding and raising and lowering said cutting-tool, means for positioning and maintaining the quarter of meat in a predetermined position in which the hollow portion at the junction of the shoulder with the remainder of the quarter is located immediately beneath the cutting-tool in the top position, and separating means whereby the remainder of the quarter is separated from the shoulder which is held by suspension means, progressively as the action of the cutting-blade takes place

6 Claims, 8 Drawing Figures

PATENTED MAY 21 1974 3,811,152

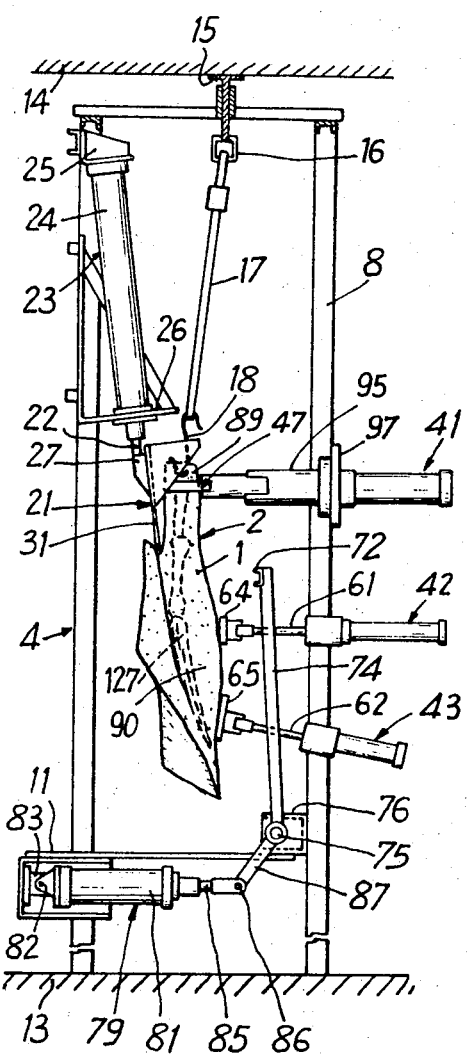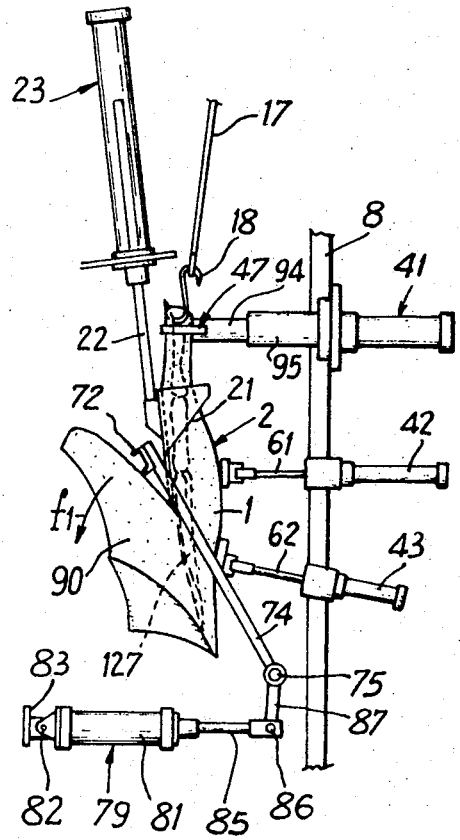

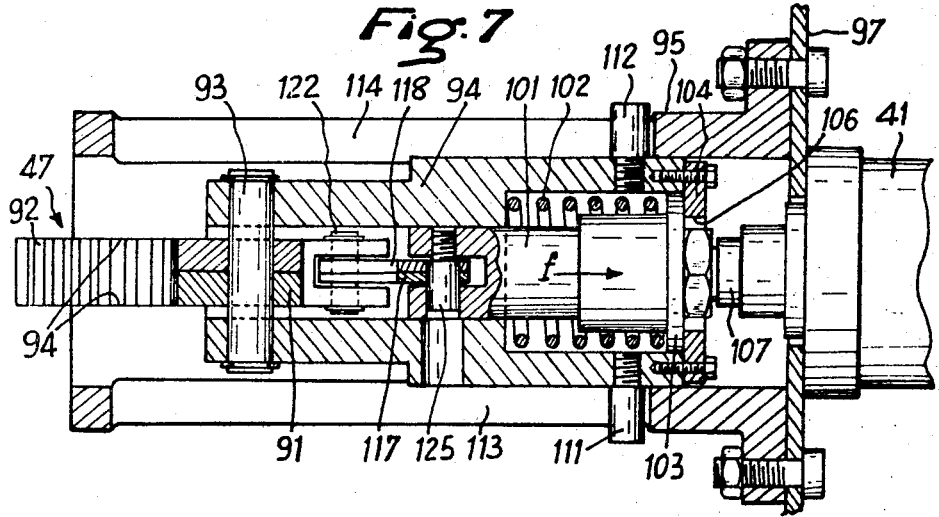
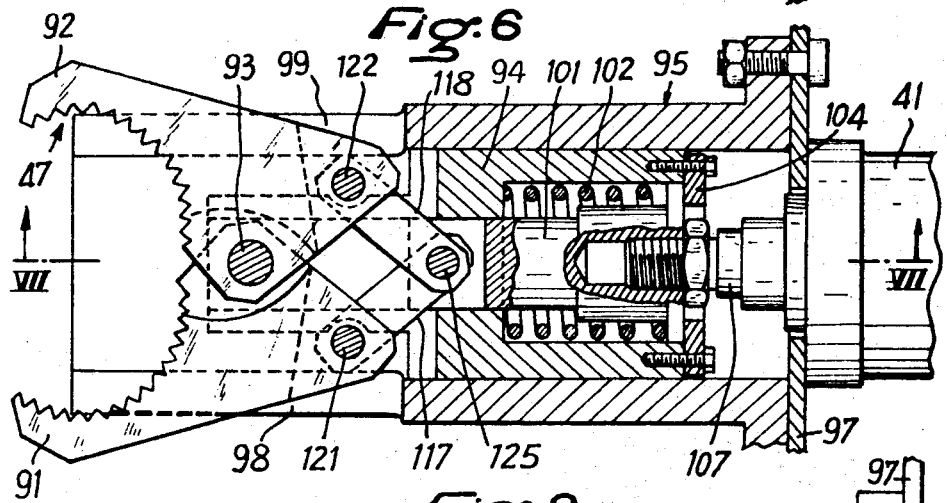
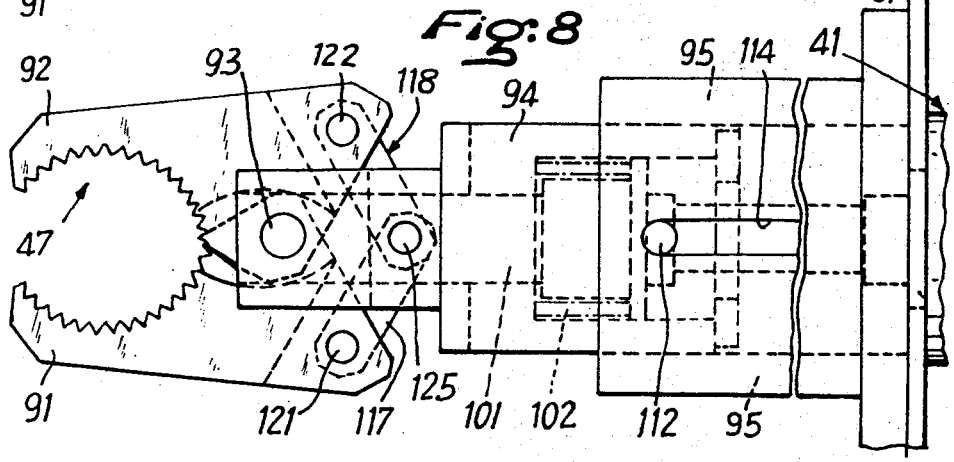

MACHINE FOR SEPARATING A SHOULDER FROM A FOREQUARTER OF MEAT

This invention relates to the separation of the shoulder from the remainder of a forequarter of meat, for example a forequarter of beef, but is applicable to the treatment of other forequarters such as, for example, quarters of veal or of mutton.

The object of this operation, which had been performed by hand up to the present time, is to permit of subsequent mechanical boning of the quarter, that is to say the mechanical removal of the backbone and of the ribs. It was therefore logical to endeavour to carry out the separation of the shoulder also by automatic mechanical means. The object of the invention is precisely to provide a machine of this tppe.

The machine in accordance with the invention essentially comprises : a frame, means for suspending a quarter of meat by the shank, a cutting-tool for separating the shoulder from the remainder of the quarter, means for guiding and raising and lowering said cutting-tool, means for positioning and maintaining the quarter of meat in a predetermined position in which the hollow portion at the junction of the shoulder with the remainder of the quarter is located immediately beneath the cutting-tool in the top position, and separating means whereby the remainder of the quarter is separated from the shoulder which is held by suspension means, progressively as the action of the cutting-blade takes place.

A better understanding of the invention will be gained from the following description and from the accompanying drawings in which one embodiment of a machine in accordance with the invention is shown by way of nonlimitative example, and in which :

FIG. 4 is a view which is similar to that of FIG. 1 and shows the position of the different components of the machine immediately before the cutting-blade comes into operation;

FIG. 5 is a profile view of the essential parts of the machine during operation;

FIG. 6 is a partial horizontal sectional view to a larger scale and showing the open clamp, this view being taken along line VI—VI of FIG. 1;

FIG. 7 is a sectional view of the clamp, this view being taken along line VII—VII OF FIG. 6;

FIG. 8 is a plan view which corresponds to FIG. 7 but in which the clamp is assumed to be closed.

Figure 1:
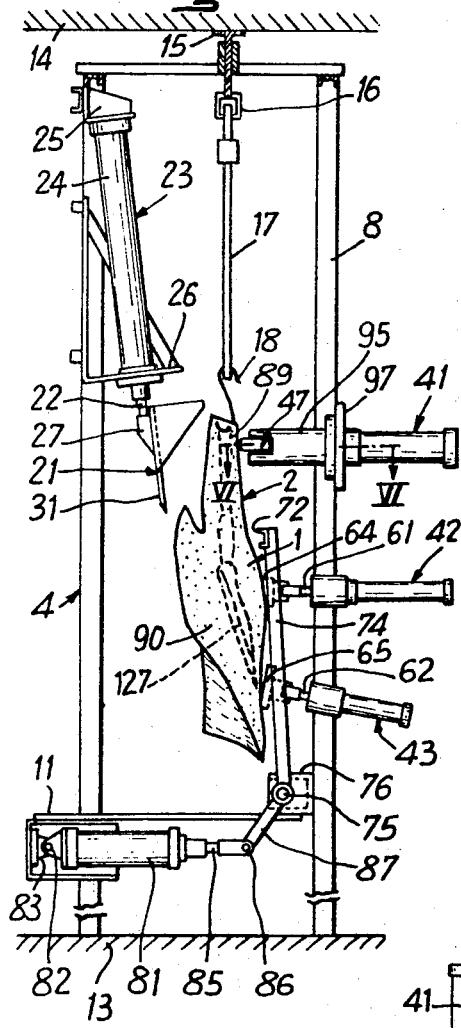
FIG. 1 is a diagrammatic profile view of the complete machine which is at rest.
Figure 2:
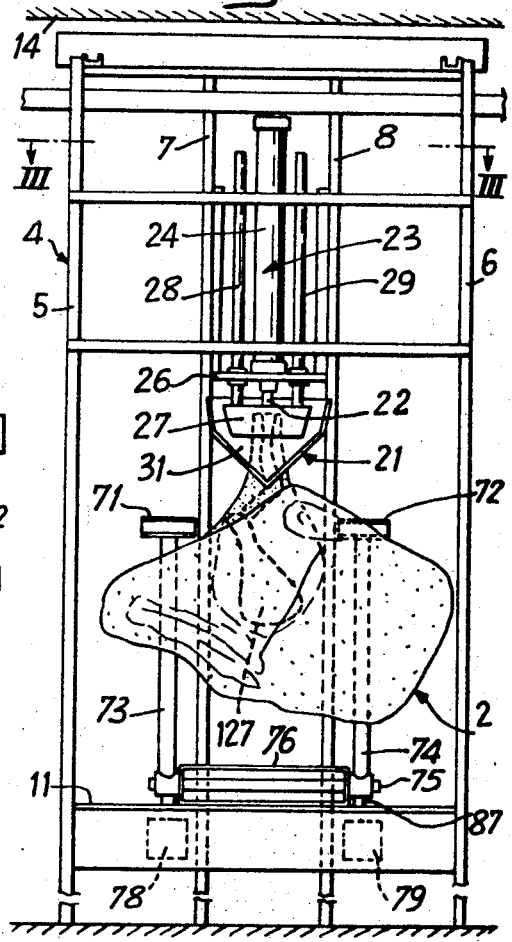
FIG. 2 is a corresponding front view.
Figure 3:
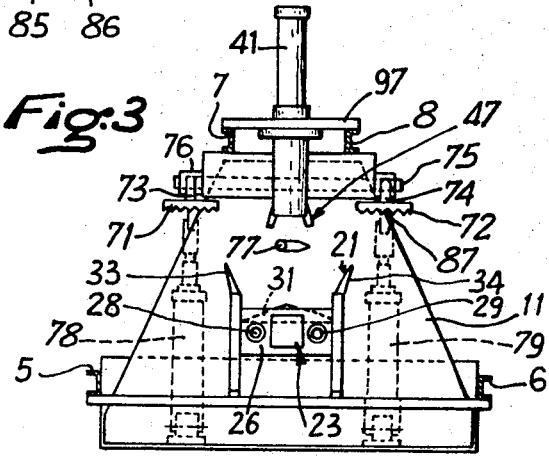
FIG. 3 is a horizontal sectional view taken substantially along line III—III of FIG. 2.

The machine which is illustrated in FIGS. 1 to 3 is intended to effect the separation of the shoulder 1 from the remainder of a meat forequarter which is generally designated by the reference 2 so as to permit subsequent mechanical boning of the quarter, that is to say the mechanical removal of the backbone and the ribs.

The operation just mentioned, namely which consists in separating the shoulder from the quarter, had been performed by hand up to the present time.

The machine which is illustrated by way of example comprises a frame constructed of structural steel members and generally designated by the reference 4. Said frame is essentially made up of two front upright members 5, 6, two rear upright members 7, 8, a table 11, and a number of different cross-members. The lower ends of the upright members are, for example, anchored in the ground 13 and the top portion of the frame is connected to the ceiling 14 of the premises by means of a sectional member 15 carrying a single rail 16 which serves as a roller track for suspension rods 17 each fitted with a hook 18 for supporting a quarter of meat 2.

The active main portion of the machine is a cutting-tool 21 having a particular structure and rigidly fixed to a support-bracket 27 which is secured to the lower extremity of the piston rod 22 of a pressure-fluid jack 23, the cylinder 24 of which is attached at both extremities to two brackets 25, 26 which are rigidly fixed to the frame of the machine. In the following description, the front portion of the machine will be understood to mean the section which carries the jack 23.

The cutting-tool 21 has a flat main face 31 provided with a lower portion of triangular shape having a downwardly directed point with a bevelled cutting edge, and with an upper portion of trapezoidal shape with two raised edges constituting two lateral faces 33, 34 which give the tool the general configuration of a shovel. Two rods 28, 29 which are parallel to the axis of the jack 23 and the lower extremities of which are secured to the support-bracket 27 of the tool are slidably mounted within the bracket 26 and prevent the tool from rotating about the axis of the jack.

The main face 31 of the tool is parallel to the axis of the jack 23 and this latter is downwardly and rearwardly inclined to a slight extent as can be seen from FIG. 1, at an angle of the order of 7° to 10°.

The machine comprises jacks for positioning the quarter of meat 2; in the example shown, these jacks are three in number, namely: a main positioning jack 41 and two auxiliary positioning jacks 42, 43 placed directly beneath each other in the vertical mid-plane of the machine. In the example which is illustrated, all these jacks are double-acting jacks of the pressure fluid type. In one simplified form of construction, the auxiliary jack 42 could be dispensed with.

The piston rod of the main positioning jack 41 actuates a pusher constituted by a clamp 47 having two jaws which will be described in detail below.

The piston rods 61, 62 of the two auxiliary positioning jacks 42, 43 are applied respectively against pushers constituted by shoes 64, 65. The two jacks 41 and 42 take up substantially horizontal positions whilst the jack 43 is downwardly and rearwardly inclined to a slight extent as shown in FIG. 1 in order to ensure good distribution of the efforts of positioning of the meat quarters.

Two toothed shoes 71, 72 are fixed respectively on the extremities of two lowering arms 73, 74 which are rigidly fixed to a shaft 75, said shaft being pivotally mounted within a casing 76 which is fixed on the rear portion of the table 11; the pivotal movements of the shaft 75 are carried out by two further pressure-fluid jacks 78, 79 which are placed beneath the table. Each of these jacks such as the jack 79, for example, is pivotally mounted at one extremity of its cylinder 81 on a pin 82 carried by a support 83 which is secured to the frame of the machine whilst the extremity of the piston rod 85 of said jack is attached by means of a pin 86 to a crank-arm 87 which is rigidly fixed to the corresponding extremity of the shaft 75. When the piston rods of the jacks aforesaid are located in the withdrawn positions thereof, the lowering arms 73, 74 take up the raised position shown in FIG. 1 in which the shoes 71, 72 are located in the rear portion of the machine. Progressively as the piston rods pass out of the cylinders, the lowering arms 73, 74 assume a sloping position in the forward direction up to the vicinity of the table 11.

The clamp 47 is illustrated in detail in FIGS. 6 and 7. The said clamp is essentially constituted by two toothed jaws 91, 92 which are pivotally mounted by means of a pin 93 on the outer extremity of a clamp-supporting slide 94 which is mounted within a guide sleeve 95, said sleeve being rigidly fixed to a plate 97 which is attached to the upright members 7, 8 of the frame of the machine. The jaws 91, 92 are guided respectively within two slots 98, 99 of the guide sleeve 95. A push-rod 101 is capable of axial displacement within the slide 94 and is subjected with respect to this latter, in the direction of the arrow $f$, to the action of a spring 102, the expansion travel of which is limited by an annular flange 103 of the said push-rod as the flange comes into contact with a plate 104 which is fixed against the rear extremity of the slide. The said plate is provided with a central opening 106 through which is inserted the rod 107 of the jack 41, the said rod being fixed by screwing, for example, within the rear extremity of the push-rod 101. Two diametrically opposite studs 111, 112 are fixed radially within the slamp-supporting slide 94 and are engaged within two corresponding longitudinal slots 113, 114 formed in the wall of the guide 95 so as to limit the amplitude of displacement of the slide within the said guide in both directions.

The two pivotal jaws 91, 92 are connected to each other and to the push-rod by means of a system of levers forming an articulated lozenge which is constituted by two link1arms 117, 118 and the portions of the said jaws which and the located between the pivot-pin 93 of the said jaws anthe pins 121, 122 about which the link-arms are pivoted to the respective jaws. The two link-arms 117, 118 are pivoted to the push-rod 101 by means of a common pin 125.

Thus, when the clamp 47 is in the open position or in other words when its two jaws 91, 92 are separated from each other as shown in FIGS. 6 and 7, the pivot-pins 93 and 125 of the articulated lozenge have the maximum relative spacing. If the push-rod 101 is displaced within the slide 94 in the direction opposite to the arrow $f$ while compressing the spring 102, the pivot-pin 25 is moved towards the pin 93 (as shown in FIG. 8), thereby effecting closure of the clamp.

This movement is obtained by means of the jack 41. When the piston rod 107 of the jack begins to move in the direction opposite to the arrow $f$, starting from the position of rest shown in FIGS. 6 and 7, the said rod thrusts back the push-rod 101 while at the same time and by means of the spring 102, thrusts back the slide 94 over the same distance until the studs 111, 112 of the slide come into contact with the left-hand extremities (in FIGS. 6 and 7) of the slots 113, 114. The slide then stops whilst the push-rod 101 continues its forward travel and consequently now moves within the said slide, thereby effecting closure of the clamp which has previously been brought into its position of maximum forward displacement.

The withdrawal of the piston rod 107 of the jack carries out in reverse movements, first the opening of the clamp as a result of expansion of the spring 102, then the withdrawal of the clamp as a result of return motion of the slide 94 within the guide sleeve 95.

The operation of the machine is as follows:

Each quarter of meat 2 to be treated is suspended by means of a hook 18 from the single rail 16 by means of which the said quarter is brought into the machine and subsequently discharged after separation of the shoulder 1.

The quarter of meat 2 to be processed is therefore presented in its natural vertical position of suspension from the hook 18 (shown in FIG. 1); the quarter is located at a short distance to the rear of the cutting-tool 21. The open clamp 47 is in its position of maximum withdrawal and is partly retracted within the sleeve 95 in order that it should not cause any hindrance to the quarter of meat as this latter passes into the machine between the cutting-tool 21 and the said clamp.

Before carrying out the operation involved in removal of the shoulder, it is important to ensure that the meat quarter is accurately positioned against the cutting-tool 21. To this end, the main positioning jack 41 is supplied in the suitable direction; the open clamp 47 thrusts back the shank 89 of the meat quarter which is at present located between the two jaws of the said clamp. At a given moment, the clamp-supporting slide 94 (shown in FIGS. 6 and 7) reaches the end of its forward travel whilst the forward motion of the main positioning jack 41 continues over a short distance (FIG. 8); the jack thus causes the clamp 47 to close onto the shank, with the result that the said shank is securely held immediately beneath the hook 18 (as shown in FIG. 4) and positioned with respect to the main plane face 31 of the cutting-tool. The two auxiliary positioning jacks 42, 43 are also supplied with a view to ensuring that their shoes 64, 65 support the meat quarter in a suitable manner in the position shown.

The following stage consists in supplying the jack 23 so as to move the cutting-tool 21 downwards in order to separate the shoulder 1 from the remainder of the quarter at the point of articulation between the said shoulder and the breast-bone. The trajectory of the cutting-tool is calculated so that this latter should follow the muscles up to the shoulder-blade without damaging these latter, thereby performing clean, neat, rapid and especially economic work since all the usable and presentable portions of the quarter are retained under the best conditions. While the cutting-tool is moving downwards, the two lower jacks 78, 79 are supplied at the same time so that the shoes 71, 72 carried by the extremities of the two lowering arms 73, 74 should exert on the remainder 90 of the meat quarter, that is to say the collar and the top ribs, an effort which is such as to cause the remainder of the quarter to carry out a pivotal movement as shown by the arrow $f1$ in FIG. 5, progressively as the cutting-tool 21 moves downwards, thus considerably facilitating the operation of the said tool. At the end of this operation, the remainder 90 of the quarter falls onto the table 11 whilst the shoulder remains suspended by the hook 18 from the single rail 16.

After the shoulder has been separated from the remainder of the quarter, the directions of supply of all the jacks are reversed, with the result that the cutting-tool 21 moves upwards, the clamp 47 and the two shoes 64, 65 withdraw whilst the two lowering arms 73, 74 move upwards and all these components accordingly return to their initial positions. The clamp 47 has opened prior to withdrawal and has released the shank 89. The shoulder is discharged by means of the single rail whilst the remainder of the meat quarter is taken away for subsequent boning operations; the machine is in readiness for receiving another quarter to be processed.

The machine is capable of processing meat quarters having different dimensions. No adaptation is required since all the quarters are homothetic and the junction of the shoulder with the remainder of the quarter is always located in the same plane with respect to the cutting-tool 21.

By reason of the fact that the shoulder is always located in a vertical plane, the plane in which the separation is to be carried out is always the same and inclined to the vertical at an angle of approximately 7°.

The range of travel of the jack 23 which actuates the cutting-tool 21 is constant and is sufficient for working on the largest quarters of meat. The range of travel of the jacks 42 and 43 employed for positioning the quarters is also constant.

Near the end of its downward travel, the cutting-tool 21 is intended to detach the meat along the shoulder-blade 127. The shoe 65 serves as an elastic stop which prevents the shoulder-blade from withdrawing towards the rear portion of the frame of the machine while the cutting-tool is scraping the bone.

The space provided within the machine between the shoe 65 and the cutting-tool 21 corresponds to the thickness of the assembly formed by the shoulder-blade and the meat on the outside of the said shoulder-blade, on small quarters of meat.

In the case of large meat quarters which require a greater amount of space, the cutting-tool 21 which moves downwards along the shoulder-blade pushes back the external meat and the shoe 65 during this movement while causing the rod of the jack 43 to withdraw over the corresponding distance, the said jack being supplied at a relatively low pressure of the order of 2 bars, for example. Automatic positional adjustment of the shoe 65 therefore takes place.

As is readily understood, the invention is not limited to the embodiment herein described with reference to the accompanying drawings; depending on the applications which are contemplated, modifications can be made in this embodiment without thereby departing either from the scope or the spirit of the invention.

What is claimed is:

1. A machine for separating the shoulder from a forequarter of meat, which forequarter has a shank, comprising an upright frame having an upwardly extending front side and an upwardly extending rear side spaced from said front side, means for suspending a forequarter of meat in the upright position between the front side and rear side of said frame, a reciprocal shovel-like cutting tool mounted on said frame and located between said means for suspending a forequarter of meat and the front side of said frame, said cutting tool comprising an upwardly extending main planar face located between the front and rear sides of said frame and having a lower triangular portion with its apex directed downwardly and a trapezoidal portion extending upwardly from the triangular portion with at least a portion of each of the upwardly extending edges of said trapezoidal portion bent angularly with respect to said main planar face and extending therefrom toward the rear side of said frame and constituting two lateral faces, guiding means mounted on the front side of said frame and operatively connected to said cutting tool for defining a rectilinear path of travel for said cutting tool inclined with respect to the vertical at an angle in the range of 7° – 10° and arranged for reciprocating said cutting tool in the downward and upward directions, means for positioning the forequarter of meat and for maintaining the forequarter in position mounted on the rear side of said frame, said means being movably positionable substantially horizontally toward and away from the path of travel of said cutting tool and arranged to clasp the shank of the forequarter of meat and to position the forequarter with respect to said cutting tool while firmly maintaining it in position during the operation of separating the shoulder, the inclination of said guiding means being directed downwardly from the front side toward the rear side of said frame and toward said positioning and maintaining means, a pair of horizontally spaced separating shoes, a lowering arm secured to each said separating shoe and mounted on said frame for supporting said separating shoes, said lowering arms located between the path of travel of said guiding means and the rear side of said frame and disposed laterally of and on opposite sides of the path of travel of said guiding means, and control means operatively connected to said lowering arms for swinging said lowering arms toward the front side of said frame so that the orientation of the portion of the forequarter of meat other than the shoulder is modified progressively with respect to the downward stroke of said cutting tool, so that said cutting tool is inserted between and follows the muscles in the shoulder up to the shoulder blade without damaging the muscles.

2. A machine as defined in claim 1, wherein said guiding means for said cutting tool comprises a pressure-fluid jack.

3. A machine as defined in claim 1, wherein said means for positioning and maintaining in position the forequarter of meat comprises a main jack, a clamping means carried by said main jack and arranged to releasably clasp the shank of the forequarter of meat, at least one auxiliary jack located below said main jack, and a positioning shoe carried by said auxiliary jack.

4. A machine as defined in claim 3, wherein a horizontally arranged shaft is mounted on the rear side of said frame below said auxiliary jack, and said lowering arms mounted on said shaft and extending upwardly therefrom for pivotal movement about the horizontal axis of said shaft.

5. A machine as defined in claim 3, wherein said clamping means comprises a horizontally arranged stationary guide sleeve carried by said main jack, a slide reciprocably mounted in said guide sleeve, said sleeve forming a pair of horizontally spaced stops for limiting the movement of said slide in said guide sleeve, a push rod slidably displaceable in said slide and operatively connected to said main jack, spring means interposed between said push rod and said slide, a pair of clamping jaws pivotally mounted in said slide, means operatively connecting said push rod to said clamping jaws for closing said jaws when said spring means are stressed at the end of the outward stroke of said slide in said guide sleeve.

6. A machine as defined in claim 14, wherein said connecting means between said push rod and said clamping jaws comprises a system of levers forming an articulated lozenge.

* * * * *